A. GRAVES.
Potato Digger.
No 77,279.
Patented April 28, 1868.
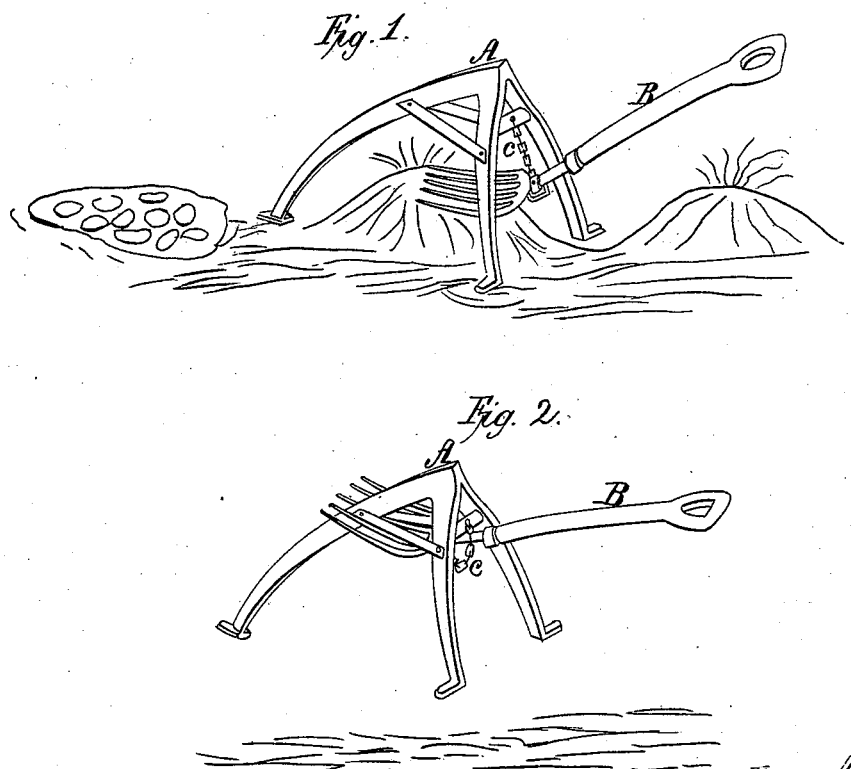

United States Patent Office.

ALVAH GRAVES, OF MARCELLUS FALLS, NEW YORK.

*Letters Patent No. 77,279, dated April 28, 1868.*

IMPROVEMENT IN POTATO-DIGGER.

*The Schedule referred to in these Letters Patent and making part of the same.*

TO ALL WHOM IT MAY CONCERN:

Be it known that I, ALVAH GRAVES, of Marcellus Falls, in the county of Onondaga, and State of New York, have invented a new and useful Improvement in Potato-Diggers; and I do hereby declare that the following is a clear, full, and exact description thereof, which will enable those skilled in the art to make and use the same, reference being had to the accompanying drawings, forming a part of this specification, in which—

Figure 1 is a perspective view of my invention, showing it in position for digging, and Figure 2 is a perspective view, showing the method of moving the device from hill to hill.

Similar letters of reference indicate like parts.

This invention relates to an improved method for digging potatoes with a potato-fork; and the invention consists in providing a light framework, which stands on three or more legs, so as to be self-sustaining, and suspending the fork therefrom by means of a chain, or other flexible connection, so that the frame acts as a fulcrum for the fork, and relieves the operator from much of the labor in the use of the fork, as hereinafter more fully explained.

In the accompanying drawings, A is the suspending-frame, to which the fork, B, is attached or suspended by a chain, $c$.

The frame A is placed over a hill, as seen in fig. 1, and the operator then inserts the fork beneath the hill, and the chain $c$ becomes the fulcrum for lifting the hill, and also holds the fork suspended while the hill is being riddled, by shaking the fork.

By this method of suspending the fork, a free riddling movement is obtained, and the fulcrum is of so stable a character, that in digging and riddling, the operator can give his whole attention to the fork.

The suspending-frame is moved from hill to hill by taking it up on the fork, as shown in fig. 2.

Having thus described my invention, what I claim as new, and desire to secure by Letters Patent, is—

The suspending-frame A and flexible or swinging connection $c$, in combination with the fork B, substantially as shown, and for the purpose described.

The above specification of my invention signed by me, this 20th day of January, 1868.

ALVAH GRAVES.

Witnesses:
 WILSON GARRISON,
 CHAS. H. STEVENS.